United States Patent [19]

Hooke et al.

[11] Patent Number: 5,663,015

[45] Date of Patent: Sep. 2, 1997

[54] SEALANT GASKETING PLASTIC NUT BATTERY TERMINAL SEAL

[75] Inventors: John Willard Hooke; Mary Jo Elwing, both of Warrensburg, Mo.

[73] Assignee: Hawker Energy Products, Inc., Warrensburg, Mo.

[21] Appl. No.: 544,813

[22] Filed: Oct. 18, 1995

[51] Int. Cl.⁶ .................................. H01M 2/30
[52] U.S. Cl. ................ 429/181; 429/182; 429/183; 429/184
[58] Field of Search .................. 429/178, 179, 429/180, 181, 182, 183, 184

[56] References Cited

U.S. PATENT DOCUMENTS

| | | | |
|---|---|---|---|
| 5,053,296 | 10/1991 | Stocchiero | 429/175 |
| 5,182,178 | 1/1993 | Brizendine | 429/160 |
| 5,273,845 | 12/1993 | McHenry et al. | 429/180 |
| 5,380,603 | 1/1995 | Hooke | 429/180 |

*Primary Examiner*—M. Nuzzolillo
*Attorney, Agent, or Firm*—Lorusso & Loud

[57] ABSTRACT

A sealed, through partition terminal for an electrochemical cell featuring the use of gasketing material to prevent the spread of electrolyte past the terminal seal assembly. An orifice formed in an inner lid of an electrochemical cell accepts a terminal member that is secured to the inner lid with a fastener threaded onto the terminal member. A shoulder molded on the bottom face of the inner lid and adjacent to the orifice prevents axial movement of the terminal member while torquing the fastener. A gap formed between the wall of the orifice and the terminal member is filled with gasketing material that is compressed by torquing the fastener. The compressed gasketing material seals any gaps between the terminal member and inner lid orifice preventing electrolyte leakage.

26 Claims, 2 Drawing Sheets

SEALANT GASKETING PLASTIC NUT BATTERY TERMINAL SEAL

BACKGROUND OF THE INVENTION (1) Field of the Invention

This invention relates to sealed, through partition terminals for electrochemical cells, and more particularly to such terminals for lead-acid batteries.

(2) Description of Related Art

A typical terminal seal design consists of a brass terminal encapsulated in a lead terminal, elastomer coating, gasket, an inner top with an orifice and counterbore to accept the terminal and gasket, a mechanical fastener (push nut) and epoxy (see for example U.S. Pat. No. 5,380,603 to Hooke).

A gasket is strategically placed between the lead terminal which is coated with a protective elastomer and the counter bore of the inner top orifice. The gasket provides an acid tight seal when compressed and held in a compressed state with the combination of the terminal, the inner top and the mechanical fastener. The brass terminal has an outside diameter (O.D.) that provides a locking means with the mechanical fastener and maintenance free connection to the battery for the end user.

The epoxy is applied to encapsulate the mechanical fastener and to provide tamper resistance. The epoxy is color coated to distinguish polarity.

The elastomer coating such as CHEMLOK, (Lord Corporation, Elastomer Products Division), has manufacturing and environmental disadvantages. These materials are typically one-part or two-part polyurethane elastomers, formed from suitable isocyanate and active hydrogen supplying monomers or blocked polymers. Polysilane-containing elastomers, such as polysilane-containing urethane elastomers are typically used as sealing enhancing coatings.

The materials are difficult to dispense due to their required low viscosity and very short working time. The one-part formulas have a very limited shelf life therefore two-part systems are used to extend the same. This change adds to the dispensing and mixing difficulties due to a nonstandard mixing ratio (12:88 parts). A thirty minute cure time is required to allow the solvents used in the elastomer formulas to evaporate. The solvents used as diluents in the elastomer coatings promote attack of various engineering plastic resins and require proper ventilation when used.

The gasket is compressed axially between the lead and the shoulder of the cover orifice. The forces required to compress the gasket exceed the forces of the lead terminal therefore an external force needs to be applied to the terminal until the mechanical fastener is applied. This makes the machinery expensive, difficult to maintain and may result in production inconsistencies.

Epoxy is difficult to dispense and mix accurately. Variation in application technique results in the formation of air bubbles, cure rate and time fluctuation and product cleanliness. A one hour cure time is necessary due to product flow requirements. The cured material is designed to resist attack from any stray acid.

SUMMARY OF THE INVENTION

It is, therefore, an object of the present invention to provide a sealing means that eliminates the need for the elastomer coating which in turn, eliminates the associated problems with elastomer cure time, elastomer component mix, elastomer dispensation and solvent application.

Another object of the present invention is to eliminate the need for the use of auxiliary support to maintain gasket compression prior to the application of a mechanical fastener.

A further object of the present invention is to eliminate the need for epoxy and the associated problems with epoxy application. Epoxy elimination should improve product flow and variation.

This invention comprises an externally threaded brass terminal encapsulated in lead, sealant gasketing material, an inner top with an orifice, and a mechanical fastener such as a high modulus plastic nut.

The terminal has a top portion and an enlarged bottom portion and external threading on the top portion. The top has a bottom surface, top surface, at least one side and a portion that defines a top orifice. The orifice is sized to receive the top portion of the terminal and not the bottom portion. The fastener has a top, a bottom, at least one side and a portion that defines a fastener orifice with internal threading axially disposed on the portion defining the fastener orifice to matingly receive the external threading on the terminal. The gasketing material is displaceable upon and disposed between the terminal, the top and the fastener.

The top has a first shoulder on the bottom surface of the top that is disposed radially to the top orifice and sized to receive the base portion of the terminal. The top can also have a second shoulder on the top surface of the top that is radially disposed to the top orifice and sized to receive the fastener.

In another embodiment, the invention can further consist of an elastomeric sealing member having portions defining an elastomeric sealing member orifice sized to receive the top portion of the terminal and to not receive the bottom portion of the terminal. The elastomeric sealing member surrounds the top portion of the terminal and is provided between the bottom portion of the terminal and the bottom surface of the top. The gasketing material is displaceable upon and between the terminal and the bottom surface of the top.

In a still further embodiment, the elastomeric sealing member is seated in a counterbore formed on the bottom surface of the top and provided between the top orifice and the first shoulder of the top. The gasketing material is again displaceable upon and between the terminal and the bottom surface of the top in this embodiment.

The terminal can be made of lead or a copper alloy and lead. The top can be made of polyphenylene oxide, ABS, or propylene. The fastener can be a high modulus plastic nut, molded with polyphenylene oxide or made of a metal alloy. The fastener can define any geometric shape including a flower petal configuration. Further, the fastener can be color coded to designate the polarity of the terminal to which the fastener is attached.

The elastomeric sealing member can be, but is not limited to, an o-ring, a rubber sleeve or a gasket. The gasketing material can be made of, but is not limited to, silicone.

The seal is achieved by inserting the brass/lead terminal coated with the gasketing material through the inner top orifice from the bottom surface of the top, placing the fastener onto the terminal top portion with the internal and external threading aligned, torquing the fastener onto the terminal to releasably secure the terminal and to compress the gasketing material while in an uncured state and restricting radial and axial travel of the gasketing material with the combination of the terminal, the fastener and the top.

In another embodiment, the terminal seal can be achieved by placing the elastomeric sealing member or gasket onto and surrounding the top portion of the terminal before inserting the terminal into the top orifice.

In a further embodiment, a counterbore formed in the bottom surface of the top is adapted to receive the elastomeric sealing member-terminal subassembly. These and other objects will become apparent from the description and drawings which follow.

The above and other features of the invention, including various novel details of construction and combinations of parts, will now be more particularly described with reference to the accompanying drawings and pointed out in the claims. It will be understood that the particular terminal seal embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Preferred embodiments of the invention will be illustrated in conjunction with the accompanying drawings in which like numerals designate like parts, and in which.

DESCRIPTION OF THE PREFERRED EMBODIMENTS

Although the invention is broadly applicable to various types of electrochemical cells and batteries, the detailed description will apply to a normally sealed or "valve-regulated" lead-acid battery of the starved electrolyte type, in which gases generated internally namely oxygen are recombined within the battery on charge and overcharge, without significant loss of weight (electrolyte) over its useful life (see U.S. Pat. No. 3,862,861 to McClelland et al.).

Figure 1:
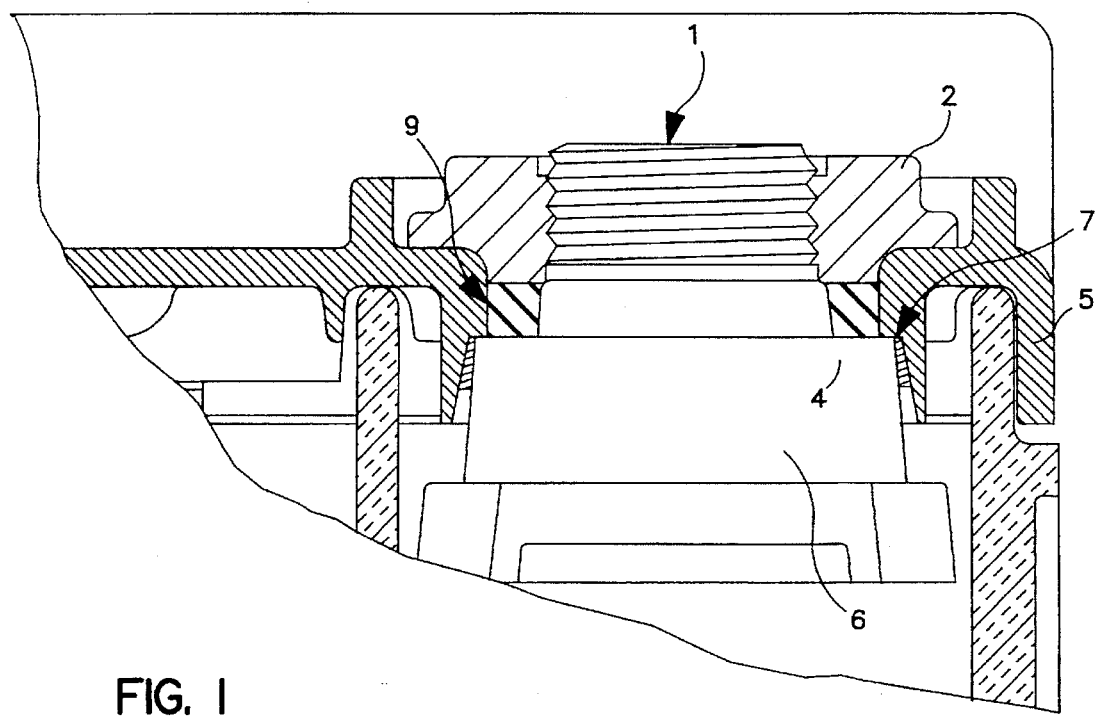
FIG. 1 is an elevational, partial sectional and broken away view of a battery and terminal construction made in accordance with one embodiment of the claimed invention.
Figure 2:
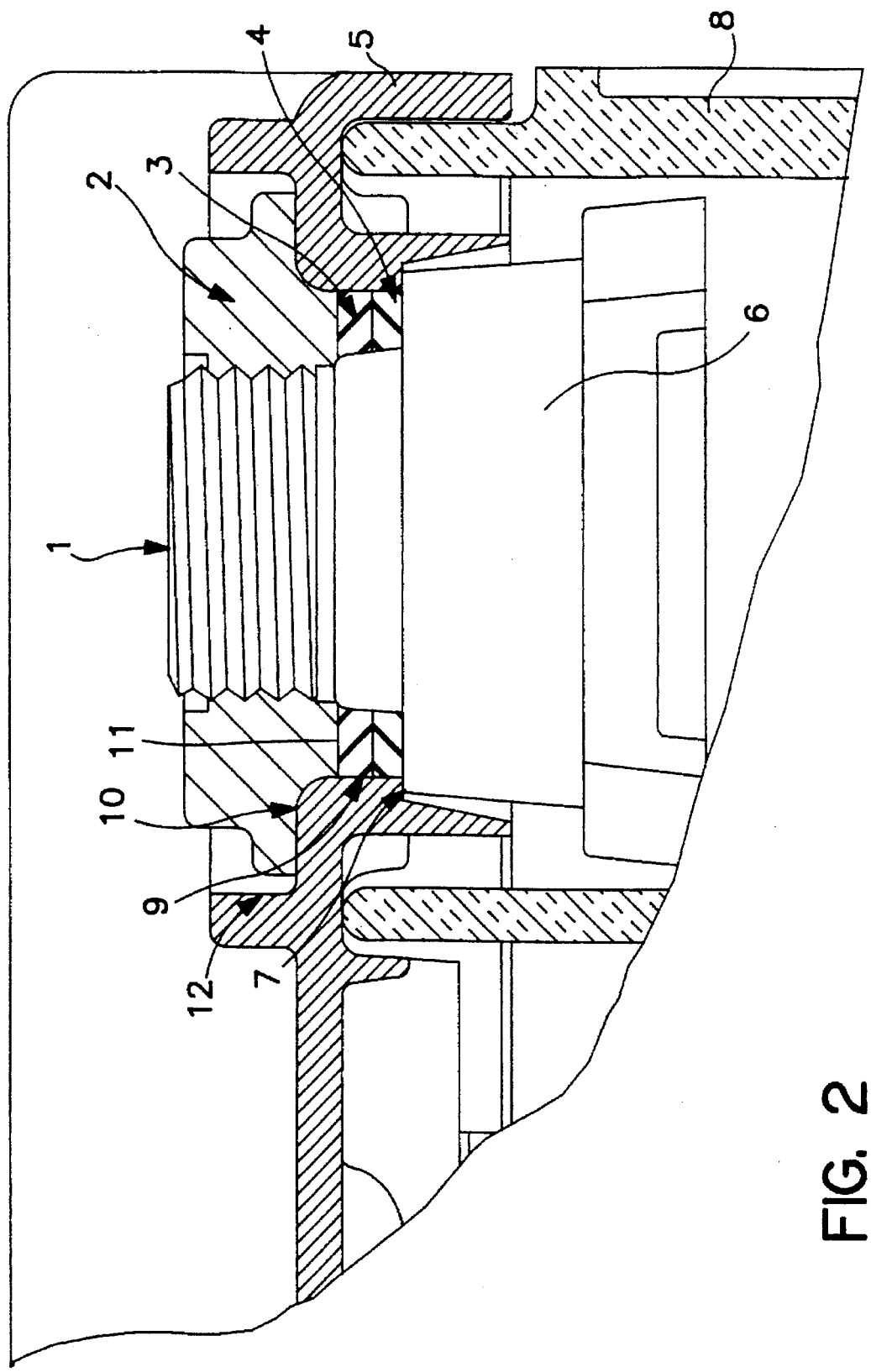
FIG. 2 is an elevational, partial sectional and broken away view of a battery and terminal construction made in accordance with one embodiment of the claimed invention.

Referring to FIGS. 1 and. 2, terminal insert 1 which is formed of brass, other copper alloy or some other electrically conductive material is externally threaded to receive the internally threaded nut 2. The perimeter of threaded nut 2 is molded or shaped into any standard geometric shape or nonstandard irregular shape to provide a holding means while torquing the nut which acts as a securing and compressing means for the terminal and gasketing material assembly.

Terminal insert 1 is preferably insert molded into terminal member 6 which is formed of an electrically conductive material such as lead. Terminal member 6 has a regular geometric shape perimeter which engages shoulder 7 of inner lid 5. Axial movement of terminal member 6 is prevented by engagement with shoulder 7 when threaded nut 2 is torqued.

Inner lid 5 is preferably formed by injection molding of a suitable engineering plastic material which is resistant to battery acids such as sulfuric acid and contains parts such as Bunsen resealable valves which are not pertinent to this invention. Suitable materials for the inner lid include NORYL (polyphenylene oxide), ABS, polypropylene and like materials. The inner lid 5 is affixed to container 8 by means of heat sealing, adhesive or the like.

The inner top is designed with an orifice to accept the terminal seal. The underside: of the inner top of the orifice is sized to centrally locate the brass lead terminal and the inner top has a shoulder to act as a vertical stop to resist terminal movement in the axial direction when the plastic nut is torqued. The orifice on the topside of the inner top is designed with a radially extended recess to accept the threaded plastic nut and to provide a tamper proof terminal seal. The inner top material could consist of any acid resistant engineering grade of plastic material, e.g., NORYL (polyphenylene oxide), ABS, Polypropylene and the like.

Internally threaded nut 2 is preferably made from a material that can withstand the application of considerable force. i.e., a material that has a high modulus (1,100,000 psi) and excellent high resistance. A nut that was evaluated and performed successfully was molded with NORYL SE1GFN3. If plastic is used, the nut can be molded in different colors to distinguish polarity. The nut is designed with an internal thread to mate with the terminal. The perimeter of the part, an irregular shape, is used to provide a holding means during torquing. Torque values are in the 10–50 in./lb. range.

The perimeter shape Can be a standard hex or any nonstandard shape. A multi-pointed flower-like shape has been successfully used. The clearance between the nut and the inner top recess is designed to be an interference on a standard wrench to provide tamper resistance.

The sealant gasketing material has a high viscosity which allows the material to be put under a slight hydrostatic pressure which causes the material to be forced into small cavities and surface imperfections. The sealant gasketing material performs the same function as the elastomer coating for lead protection from acid. The use of the uncured sealant gasketing material reduces the need for precise concentricity between the inner top orifice and the lead terminal gasket improving manufacturing assembly.

The sealant gasketing material that has been tested with positive results is the LOCKTITE ULTRAL BLUE SILICONE 587. It is an industrial/electronic grade sealant for gasketing applications. The sealant gasketing material also acts as a thread locker which increases the back out torque required to move the plastic nut therefore increasing the tamper resistance.

To assemble the terminal seal assembly, terminal member 6 is inserted from the bottom face: of inner lid 5 through an orifice 9 molded into inner lid 5 so that the outer perimeter portion of terminal member 6 engages the: shoulder 7 of inner lid 5. A gap formed by the top surface of terminal member 6 and the wall of orifice 9 is filled with gasketing material 4. While gasketing material 4 is still in an uncured states, nut 2 is rotated onto terminal 1 and torqued until gasketing material 4 is compressed between the wall of orifice 9, terminal member 6 and the bottom face of nut 2. A second wall 12 molded and formed on inner lid 5 is sized to accommodate the outer perimeter dimensions of nut 2. Nut 2 is torqued until contact with inner lid shoulder 10 which prevents gasketing material 4 from leaking out of gap 11. Preferably, torque values are in the range of 10–50 in./lbs. The compressed gasketing material 4 is forced into any irregularities or imperfections in the surface of terminal member 6 and the wall of orifice 9 thereby preventing the leakage or spread of electrolyte past the terminal seal.

In another embodiment, elastomeric sealing member 3, e.g., an o-ring, is placed in the gap before the addition of the gasketing material 4. After the gasketing material has been placed in the gap 11, nut 2 is torqued onto terminal 1 until making contact with shoulder 10.

In a further embodiment, a recess or counterbore 13 is formed on the underside of inner lid 5 extending radially from the orifice 9. The o-ring is sized to fit within the counterbore 13. The o-ring is placed in the counterbore 13 before the addition of the gasketing material 4. After the gasketing material has been placed in the gap 11, nut Z is torqued onto terminal member 6 until making contact with shoulder 10.

While representative embodiments have been shown for the purpose of illustrating the invention, it will be apparent to one skilled in the relevant art that changes and modifications can be made without departing from the spirit and scope of the invention.

Having thus described my invention, what I claim as new and desire to secure by United States Letters Patent is:

1. A method of making a terminal seal comprising:

coating with gasketing material a terminal having a top portion, a bottom portion and axially disposed external threading on said top portion, an inner top having a bottom surface, a top surface, at least one side and a portion defining an orifice sized to receive said terminal and a fastener having a portion defining a fastener orifice with internal threading axially disposed on said portion defining said fastener orifice sized to matingly receive said terminal;

inserting said terminal coated with said gasketing material through said top orifice from said bottom surface of said inner top;

placing said fastener onto said terminal top portion with said internal and external threading matingly aligned;

torquing said fastener onto said terminal to releasably secure said terminal and to compress said gasketing material while in an uncured state; and restricting radial and axial travel of said gasketing material with the combination of said terminal, said fastener and said inner top.

2. The method of claim 1 further comprising:

an elastomeric sealing member having portions defining an elastomeric sealing member orifice sized to receive said top portion of said terminal being placed onto and surrounding said top portion of said terminal before inserting said terminal into said top orifice.

3. The method of claim 2 further comprising:

a counterbore formed on said bottom surface of said inner top and provided radially from said top orifice and sized to receive said elastomeric sealing member;

inserting said terminal coated with said gasketing material and surrounded by said elastomeric sealing member through said top orifice from said bottom surface of said inner top and seating said elastomeric sealing member in said counterbore of said inner top before placing said fastener on said inner top.

4. A terminal seal comprising:

a terminal, an inner top, gasketing material and a fastener;

said terminal having a top portion and a bottom portion;

said inner top having a bottom surface, a top surface, at least one side and a portion defining a top orifice;

said top orifice being sized to receive said top portion of said terminal and to not receive said bottom portion of said terminal;

said top portion of said terminal having external threading disposed axially on said top portion;

said fastener having a top, a bottom, at least one side and a portion defining a fastener orifice;

said fastener having internal threading axially disposed on said portion of said fastener defining said fastener orifice to matingly receive said external threading of said terminal;

said gasketing material being displaceable upon and disposed between said terminal, said inner top and said fastener.

5. The terminal seal of claim 4, wherein said inner top has a first shoulder on said bottom surface of said inner top and disposed radially to said top orifice.

6. The terminal seal of claim 5 wherein said first shoulder of said inner top is sized to receive said bottom portion of said terminal.

7. The terminal seal of claim 5 wherein said inner top has a second shoulder on said top surface of said inner top;

said second shoulder being disposed radially to the perimeter of said top orifice.

8. The terminal seal of claim 7 wherein said second shoulder of said inner top is sized to receive said fastener.

9. The terminal seal of claim 4 wherein said terminal is lead.

10. The terminal seal of claim 4 wherein said terminal is comprised of a copper alloy and lead.

11. The terminal seal of claim 4 further comprising:

an elastomeric sealing member;

said elastomeric sealing member having portions defining an elastomeric sealing member orifice;

said elastomeric sealing member orifice being sized to receive said top portion of said terminal and not receive said bottom portion of said terminal.

12. The terminal seal of claim 11 wherein said elastomeric sealing member surrounds said top portion of said terminal and is provided between said bottom portion of said terminal and said bottom surface of said inner top.

13. The terminal seal of claim 11 wherein said gasketing material is displaceable upon and between said terminal, said inner top, said fastener and said elastomeric sealing member.

14. The terminal seal of claim 11 wherein said elastomeric sealing member is seated in a counterbore formed on said bottom surface of said inner top and provided between said top orifice and said first shoulder of said inner top.

15. The terminal seal of claim 14 wherein said gasketing material is displaceable upon and between said terminal, said inner top, said fastener and said elastomeric sealing member.

16. The terminal seal of claim 4 wherein said elastomeric sealing member is an o-ring.

17. The terminal seal of claim 4 wherein said elastomeric sealing member is a rubber sleeve.

18. The terminal seal of claim 4 wherein said side of said fastener defines a geometric pattern.

19. The terminal seal of claim wherein said fastener is color coded to designate the polarity of said terminal to which said fastener is attached.

20. The terminal seal of claim 4 wherein said fastener is a plastic nut.

21. The terminal seal of claim 4 wherein said fastener is molded with polyphenylene oxide.

22. The terminal seal of claim 4 wherein said fastener is a metal alloy.

23. The terminal seal of claim 4 wherein said inner top is molded with polyphenylene oxide.

24. The terminal seal of claim 4 wherein said inner top is molded with ABS.

25. The terminal seal of claim 4 wherein said inner top is molded with propylene.

26. The terminal seal of claim 4 wherein said gasketing material is silicone.

* * * * *